United States Patent [19]
Ort et al.

[11] 4,224,264
[45] Sep. 23, 1980

[54] FOAM CRYSTALLIZATION OF CONDENSATION POLYMERS

[75] Inventors: Morris R. Ort, Wilbraham; Elizabeth L. Newell, Springfield, both of Mass.

[73] Assignee: Monsanto Company, St. Louis, Mo.

[21] Appl. No.: 4,433

[22] Filed: Jan. 18, 1979

[51] Int. Cl.$^2$ .............................................. B29D 27/00
[52] U.S. Cl. ............................................ 264/54; 264/85; 264/141; 264/176 R; 264/176 F; 521/79; 521/182
[58] Field of Search ............... 264/54, 230, 53, 176 R, 264/85, 141; 521/79, 182

[56] References Cited

U.S. PATENT DOCUMENTS

| | | | |
|---|---|---|---|
| 3,036,991 | 5/1962 | Kantor et al. | 264/230 X |
| 3,227,784 | 1/1966 | Blades et al. | 264/53 |
| 3,384,696 | 5/1968 | Makansi | 521/182 X |
| 3,585,259 | 6/1971 | Lefferts et al. | 264/50 |
| 3,586,647 | 6/1971 | Kremer | 521/182 X |
| 4,051,112 | 9/1977 | Kuratsuji et al. | 264/141 X |
| 4,097,421 | 6/1978 | Chang | 521/182 X |
| 4,097,425 | 6/1978 | Niznik | 521/182 X |

OTHER PUBLICATIONS

Brydson, J. A. "Plastics Materials" Princeton, N.J., D. Van Nostrand, c 1966; p. 446–448.
Frazer, A. H. "High Temperature Resistant Polymers" New York, Interscience, c 1968, pp. 106–108.

*Primary Examiner*—Philip Anderson
*Attorney, Agent, or Firm*—R. Bruce Blance; William J. Farrington; Edward P. Grattan

[57] ABSTRACT

A normally amorphous condensation polymer is crystallized by foaming it with a chemical blowing agent at a temperature above the softening point of the polymer, extruding the molten polymer to form a solid foam and maintaining the foam at a temperature above the glass transition temperature until crystallization occurs. The crystallized polymer foam may be used as a structural foam. It can be used in solid state polymerization to obtain polymers of enhanced degree of polymerization.

35 Claims, No Drawings

FOAM CRYSTALLIZATION OF CONDENSATION POLYMERS

This invention relates to a process for the crystallization of normally amorphous crystallizable linear condensation polymers, to the crystallized foam products and to the use of such crystallized foam products in solid state polymerization. In one aspect it relates to the crystallization of normally amorphous polyarylene esters, to crystallized foams of such polyesters and to the solid state polymerization of such crystallized polyarylene esters.

Linear condensation polymers can be produced by melt polymerization. However, because of high melt viscosity, high reaction temperatures may be required and particularly when high molecular weight polymers are produced, the polymers may be highly colored by degradation and generation of chromophores and hence commercially unmarketable. Crystalline polymers can be readily advanced in molecular weight by solid state polymerization at temperatures above the glass transition temperature but below the melting point, and this technique of solid state polymerization has been successfully used to produce high molecular weight crystalline polymers of improved color. Amorphous polymers tend to soften and flow above the glass transition temperature, and films, strads or pellets of such amorphous polymers which might be used in solid state polymerization adhere or agglomerate and defeat attempts to polymerize such materials by this process. Certain normally amorphous linear condensation polymers can be induced to crystallize under special conditions and can then be subjected to solid state polymerization. However, such crystallization is generally effected by a lengthy and uneconomic thermal crystallization process or by a solvent treatment with a selected solvent which can swell the polymer slightly without dissolving it or causing it to coalesce. Prior to solid state polymerization, the solvent must be removed since, if it is low boiling, it depresses the reaction temperature and if it is high boiling it can act as a sticking agent at elevated temperatures. The addition, removal and recovery of solvent require time and additional processing equipment, which with the cost of the solvent, exact an economic penalty.

According to the present invention, a normally amorphous polymer is crystallized by dispersing a chemical blowing agent in the molten polymer, extruding the molten polymer to form a solid foam and maintaining the solid foam at a temperature above the glass transition temperature of the polymer until crystallization occurs. By this process crystallization occurs within minutes in contrast to thermal crystallization of unfoamed polymer which requires hours. Moreover, because the amount of chemical blowing agent is minor, generally less than about 2 percent, and because conditions for crystallization can be selected so that the blowing agent is essentially all decomposed, the blowing agent does not interfere with further processing of the crystallized polymer. Other aspects of the invention are directed to solid foam of the crystallized polymer which may be used in structural foam applications and to the use of the crystallized polymer foam in solid state polymerization to enhance the degree of polymerization of the polymer.

The linear condensation polymers which are amenable to the crystallization processes are those polymers which are normally amorphous, i.e., those polymers which, cooled fairly rapidly at a rate of 1° C./min. or more to solidify them from their melt, and subjected to differential scanning calorimetry, exhibit no appreciable endotherm when they are remelted by heating at a rate of at least 2° C./min. because they neither crystallize during the cooling and solidification nor crystallize when they are heated to remelt them.

Included within the ambit of linear condensation polymers suitable for the crystallization process are linear polyesters, polyamides, polyimides, and polyureas. Generally, such linear condensation polymers comprise a sufficient number of units which contribute a degree of irregularity or assymetry to the polymer molecule so that a high degree of order or crystallinity is not possible, but the number or shape of such units is insufficient to prevent the formation of the low degree of order which appears when the polymer is subjected to the process of the invention.

Among the polyesters which may be used in the process of the invention are polyalkylene and polyarylene esters of aliphatic or aromatic dicarboxylic acids and polycarbonates. Such polyesters include polyalkylene isophthalate-terephthalate copolymers and polyalkylene isophthalate-2,6-naphthalate copolymers of $C_2$ to $C_6$ alkanediols containing sufficient isophthalate to disrupt the normally highly ordered terephthalate or naphthalate structure, and polyarylene esters of $C_6$ to $C_{20}$, bis(4-hydroxyphenyl)methane, 2,2-bis(4-hydroxyphenyl)propane, bis(4-hydroxyphenyl) ether and 3,3-bis(4-hydroxyphenyl)pentane and $C_8$ to $C_{20}$ dibasic aromatic acids. Preferred $C_8$ to $C_{20}$ acids include isophthalic and terephthalic acids and mixtures thereof. Polyesters which are particularly amenable to the process of the invention are polyisophthalates of 2,2-(4-hydroxyphenyl)propane and polyisophthalate-terephthalates of 2,2-bis(4-hydroxyphenyl)propane containing from 0 to 25 mol percent terephthalate units.

Among the preferred linear condensation polymers for the process of the invention are those polymers with a glass transition temperature above 100° C. because such polymers when they are crystallized are particularly suitable for solid state polymerization which provides a means of avoiding the problem of high melt viscosity encountered in melt polymerization of such polymers. Even more preferred are polymers with a glass transition temperature above about 150° C. The process of the invention is therefore well suitable to the preparation of crystallized polyesters of 2,2-bis(4-hydroxyphenyl)propane and especially to the polyisophthalates of this diphenol.

The low degree of order or crystallinity of the crystallized polymers obtained by the process of the invention is manifested by the relatively low heat of fusion of the polymer which is generally in the range of about 12 to about 40 J/g and is preferably in the range of about 16 to about 30 J/g. Polymers which readily crystallize or cold crystallize and which are therefore, not contemplated for the crystallization process of the present invention generally have heats of fusion greater than about 40 J/g. Polymers which have heats of fusion of less than about 12 J/g do not possess a sufficient degree of stiffness when they are heated at temperatures substantially above their glass transition temperatures and tend to soften and flow particularly when they are subjected to solid state polymerization.

The ease of crystallization and degree of crystallinity of a linear condensation polymer are functions of the molecular weight of the polymer and generally decrease with increasing molecular weight. Thus, low molecular weight crystalline polymers can become normally amorphous polymers suitable for crystallization by the process of the invention when they are advanced in molecular weight. Similarly, low molecular weight normally amorphous polymers suitable for crystallization by the process of the invention can become amorphous and uncrystallizable when they are advanced to very high molecular weight. For example, the polyisophthalate of 2,2-bis(4-hydroxyphenyl)propane of inherent viscosity in the range of about 0.15 to about 0.7 dl/g determined at 25° C. with a solution containing 0.5 g polymer per 100 ml of a solvent pair of phenol and sym-tetrachloroethane in the weight ratio of 60:40, is crystallized by the process of the invention to yield a polymer with a heat of fusion in the range of about 12 to 40 J/g, the ease of crystallization decreasing with increase in inherent viscosity. However, when the crystallized polymer is subjected to solid state polymerization to increase the molecular weight to a level corresponding to an inherent viscosity greater than about 0.7 and the high molecular weight polymer thus obtained is melted, it is found to be very difficult to crystallize and the degree of crystallinity of the crystallized polymer is rather insignificant since the heat of fusion is appreciably less than 12 J/g.

The chemical blowing agents which are used in the invention are selected from several chemical groups. Preferably, they are selected to have a decomposition temperature above the glass transition temperature of the polymer and more preferably above the melt temperature of the polymer. Such blowing agents include inorganic carbonates such as sodium bicarbonate; aliphatic azo compounds such as 2,2′-azobisisobutyronitrile, 1,1′-azobiscyclohexanecarbonitrile, azobisformamide and N,N′-di-tert-butylazobisformamide; hydrazine derivatives such as bisbenzenesulfonyl hydrazide, 1,3-benzenedisulfonyl dihydrazide, 4,4′-oxybis(benzenesulfonyl hydrazide), 3,3′-sulfonylbis(benzenesulfonyl hydrazide), trihydrazino-sym-triazine, oxalylbis(sulfonyl hydrazides) described in U.S. Pat. No. 3,888,802 and hydrazine derivatives with a high decomposition temperature such as the derivative sold by Uniroyal Inc. under the registered tradename Celogen HT550; semicarbazides such as methanesulfonyl semicarbazide and 4,4′-oxybisbenzenesulfonyl semicarbazide; N,N′-dinitrosoamides such as N,N′-dimethyl-N,N′-dinitrosoterephthalamide; oxalylbis(carbazates) described in U.S. Pat. No. 3,819,545; and substituted tetrazoles described in U.S. Pat. No. 3,442,829, such as 5-phenyltetrazole, 5-tolyltetrazole and 5-cyclohexyltetrazole.

The blowing agent is preferably selected so that it and its decomposition products are inert to the linear condensation polymer in order that degradation or crosslinking does not occur. Thus for polyesters, the blowing agent is preferably selected from those which do not evolve ammonia upon decomposition. It is therefore preferably selected from the group consisting of the hydrazides of organic sulfonic acids, hydrazine derivatives, substituted tetrazoles, semicarbazides, carbazates and dinitrosoamides. The substituted tetrazoles are preferred since they have relatively high decomposition temperatures.

The blowing agent can be added as a solid powder, or as a dispersion in an inert liquid or with a diluent such as silica or a neutral clay. The particle size of the blowing agent is usually sufficiently small to facilitate uniform blending with the linear condensation polymer and is generally less than about 50 microns.

The blowing agent and linear condensation polymer can be blended in any equipment suitable to give a uniform blend. The blend is then heated to yield a melt of the polymer and is maintained at a temperature above the decomposition temperature of the blowing agent until foaming occurs, whereupon the melt is cooled and maintained above the glass transition temperature of the polymer and below the melting point of the polymer and more preferably at least about 20° C. below the melting point of the polymer until crystallization occurs and it is then cooled below the glass transition temperature. The melt blending operation can be carried out in a melt extruder and the polymer blend can be extruded at the foaming step to provide strands, ribbons, films or sheets of foam. Alternatively, the melt blending can be carried out in an injection molding machine, and foaming can be carried out at the injection molding step. When the polymer foam is to be used for solid state polymerization, the extruded strands, ribbons, films or sheets of foam may be chopped into particles of a size suitable for solid state polymerization, either before or after the crystallization step.

The amount of blowing agent dispersed in the linear condensation polymer is sufficient to provide a uniform closed cell foam. The density of the foam is preferably in the range of about 0.4 to about 1.0 g/cc and more preferably in the range of about 0.5 to about 0.8 g/cc.

The amount of blowing agent used for the desired foam density will depend on the particular blowing agent selected and on the amount of gas generated by it upon decomposition and will depend on the particular melt blending and extrusion process selected because the efficiency of the blowing agent can be affected by the tendency of a particular melt extruder to allow gaseous products of decomposition of the blowing agent to escape from the extruder. In general the amount will range from about 0.1 to about 1.5 parts by weight per 100 parts by weight of polymer and more preferably will range from about 0.1 to about 0.5 parts by weight per 100 parts by weight of polymer to provide a sufficient degree of foaming to enhance the rate of crystallization without yielding an undesirably low density or an open pore structure.

When the crystallized foam is subjected to solid state polymerization, it is maintained at a temperature below the melting point of the polymer and more preferably at least about 20° C. below the melting point of the polymer until the degree of polymerization of the polymer has increased to the desired level. The foamed polymer in continuous strand, ribbon, film or sheet form, or as pellets prepared by chopping or dicing the strands, ribbons, films or sheets of foamed polymer, is maintained in an inert atmosphere provided by an inert gas such as nitrogen, carbon dioxide, or helium under conditions which allow the low molecular weight products of the advancing condensation polymerization to be removed from the polymer. Such conditions may be obtained by allowing a stream of the inert gas to flow over the polymer or through the pellets of the polymer, or by maintaining the atmosphere surrounding the polymer at a pressure below atmospheric pressure.

When pellets of polymer are used in the solid state polymerization, they may be coated with a sufficient amount of an antisticking agent to enhance the ability of the pellets to remain as discrete particles and to avoid their clumping, clustering or agglomeration. Such antisticking agents are generally inert, finely divided inorganic powders such as talc.

Various other ingredients may also be incorporated into the linear condensation polymer prior to the foaming step, including antioxidants, stabilizers, dyes, pigments, plasticizers, reinforcing agents and nucleating agents.

The following examples are set forth in illustration of the present invention and are not to be construed as a limitation thereof. Unless otherwise indicated, all parts and percentages are by weight. Glass transition temperatures are taken to be the midpoint of the heat capacity change for the polymer heated at a rate of 20° C. per minute on a DuPont 990 Thermal Analyzer. Melting points and heats of fusion are also determined by Differential Scanning Calorimetry. The peak of the melting endotherm is designated as the melting point. The heat of fusion is calculated from the integrated area of the melting endotherm as follows:

$$\Delta H_f = A \cdot S \cdot tb/w$$

A = Area (cm$^2$) S = Instrument Sensitivity (J/sec.cm) tb = Time Base (sec./cm) w = Sample Weight (g) The heat of fusion is a measure of the degree of crystallinity of the polymer.

EXAMPLE 1

250 Parts by weight of a polyisophthalate of 2,2-bis(4-hydroxyphenyl)propane and 0.3125 parts by weight of 5-phenyltetrazole of particle size in the range of 12-30 microns, the average of which is 18 microns, are melt blended in a Brabender Extruder at a temperature of 260° C. and a mixing rate of 31 rpm. The melt is extruded through a die of 3.25 mm diameter to provide strands of 2.36 mm diameter and 0.64 g/cc density, in the form of a closed cell foam containing many fine cells. The strands are heated from room temperature to 230° C. in 105 minutes to provide a crystallized polymer which when subjected to differential scanning calorimeter, exhibits a melting point at 297° C. and a heat of fusion of 22 J/g. The temperature is raised to 280° C. and the nitrogen flow rate to 56.6 liters per hour per kilogram of pellets. After 14 hours, the inherent viscosity of the polyester is 0.51 dl/g.

EXAMPLE 2

250 Parts by weight of a polyisophthalate of 2,2-bis(4-hydroxyphenyl)propane of inherent viscosity 0.36 prepared by condensation of equimolar quantities of 2,2-bis(4-acetoxyphenyl)propane and isophthalic acid, and 0.625 parts by weight of the 5-phenyltetrazole are melt blended in a Brabender Extruder at a temperature of 250° C. and a mixing rate of 21 rpm. The melt is extruded through a single strand die of 3.25 mm diameter to provide strands of 1.9 mm diameter and 0.38 g/cc density, in the form of a closed cell foam containing a fine cellular structure. The strands are cooled and are chopped to give pellets of average length of 4.3 mm. The pellets are tumbled with 0.5 parts by weight of a finely divided talc sold by Pfizer under the tradename of Micro Talc CP 10-40 until an even coating of the pellets is obtained.

The pellets are placed in a rotating reactor in an air circulating oven, equipped with a thermocouple and temperature recorder. A stream of nitrogen is passed through the bed of pellets at a rate of 14.3 liters per hour per kilogram of pellets. The oven temperature controller is set to 230° C. and the temperature of the foamed pellets is recorded at intervals. The reactor is rotated at 20 rpm. After 48 minutes the temperature reaches 205° C. and the pellets are observed to be somewhat opaque, suggesting that crystallization has occurred. After 54 minutes the temperature is 210° C., and the polyisophthalate is shown to be crystalline and to exhibit by differential scanning calorimetry a melting point of 298° C. and a heat of fusion of 18 J/g. After 105 minutes, the temperature is 227° C. and the heat of fusion of the polyester increases to 22 J/g. The pellets show no tendency to flow or agglomerate. The temperature is raised to 280° C. and the flow rate of nitrogen to 56.6 liters per hour per kilogram of pellets. After 14 hours at 280° C., the inherent viscosity of the polyester is 0.55 dl/g.

EXAMPLE 3

This Example is provided for comparative purposes to demonstrate thermal crystallization of the polyisophthalate of Example 2 without the foaming step.

250 Parts by weight of pellets of the polyisophthalate are tumbled with 0.5 parts by weight of talc until an even coating of the pellets is obtained. The pellets are placed in the reactor and a stream of nitrogen is passed through at a rate of 14.3 liters per hour per kilogram of pellets. The oven temperature controller is set to 230° C. and the reactor is rotated at 15 rpm. After 105 minutes, the temperature of the pellets is 228° C. The heat of fusion of the pellets is 0.8 J/g showing that little crystallization has occurred. Heating is continued for a further 90 minutes (195 minutes total). The polyester exhibits a melting peak at 292° C. and a heat of fusion of 5.85 J/g. The temperature is increased to 256° C. and after 345 minutes of total heating, the heat of fusion of the polymer is 12.1 J/g. After a further 60 minutes, the heat of fusion increases to 31.8 J/g and the pellets show no tendency to flow or agglomerate. The temperature is then increased to 280° C. and the flow rate of nitrogen to 56.6 liters per hour per kilogram of pellets. After 14 hours at 280° C., the inherent viscosity of the polyisophthalate is 0.57 dl/g.

Examples 4 and 5 illustrate the usefulness of the foaming step in promoting thermal crystallization of higher molecular weight material.

EXAMPLE 4

250 Parts by weight of a polyisophthalate of 2,2-bis(4-hydroxyphenyl)propane of inherent viscosity 0.60 dl/g and 0.3125 parts of 5-phenyltetrazole of Example 1 are melt blended at 290° C. and 12 rpm in a Brabender Extruder and extruded as in Examples 1 and 2 to provide a smooth strand with a low concentration of closed cells and an inherent viscosity of 0.53 dl/g. The pellets are tumbled with 0.5 parts of microtalc in a rotating unit in a circulating air oven and are then heated to 230° C. in 88 minutes. A crystalline polymer results with a peak melting point at 292° C. and a heat of fusion of 23 J/g.

EXAMPLE 5

250 Parts of a polyisophthalate of 2,2-bis-(4-hydroxyphenyl)propane of inherent viscosity 0.60 dl/g and 0.5 parts by weight of microtalc CP 10-40 are charged into a rotating unit mounted in an air circulating oven and tumbled until the pellets are well coated. The pellets are heated to 230° C. and maintained at 230° C. for 105 minutes. The temperature is raised to 240° C. and maintained at that temperature for 120 minutes. The temperature is raised to 250° C. and maintained at 250° C. for 120 minutes (420 minutes total from room temperature). The resultant polymer has a heat of fusion of less than 2 J/g and a melting point of 302° C.

EXAMPLE 6

200 Parts by weight of a polyisophthalate of 2,2-bis(4-hydroxyphenyl)propane and 0.250 parts of Celogen HT550, a high melting hydrazine derivative, are melt blended in a Brabender Extruder and extruded as in Example 1 but not pelletized due to a high degree of brittleness. The foamed strand crystallizes readily during differential scanning calorimetry. The maximum crystallization rate occurs at 246° C. The melting point of the crystallized polymer is 297° C.

EXAMPLE 7

This Example demonstrates the increase in tensile modulus obtained by crystallization of a polyester foam.

400 Parts of a polyarylene ester, prepared by condensing 2,2bis(4-hydroxyphenyl)propane and a mixture of dibasic acids containing 97 mole % isophthalic acid and 3 mole % azelaic acid, of inherent viscosity of 0.60, is melt blended at 290° C. in a Brabender Extruder with 0.5 parts by weight of 5-phenyltetrazole and extruded through a ribbon die 25 mm wide and 1.27 mm thick. The extruded polymer has an inherent viscosity of 0.55 and contains a foam structure of fine, spherical, uniformily dispersed bubbles.

Several lengths of ribbon approximately 150 mm long, 17 mm wide and 1.2 mm thick are placed in an air circulating oven at room temperature and the oven is heated to 235° C. in 77 minutes. At 65 minutes and an oven temperature of 235° C. some opacity is observed in the ribbons. At 77 minutes and the same oven temperature the ribbons appear completely opaque and indeed have a melting point at 292° C. and a heat of fusion of 24 J/g.

Sections of the polymer ribbon before and after thermal crystallization are shaped routed into tensile bars and the tensile modulus is measured by AST Method D-638. The modulus before crystallization is 1738 MPa and after crystallization the modulus is 2048 MPa.

EXAMPLE 8

This Example demonstrates the increase in tensile modulus obtained by crystallization of a polyester foam containing talc.

200 Parts of a polyarylene ester, prepared by condensing 2,2-bis(4-hydroxyphenyl)propane and a mixture of dibasic acids containing 97 mole % isophthalic acid and 3 mole % azelaic acid, of inherent viscosity of 0.60, is melt blended at 290° C. in a Brabender Extruder with 0.4 parts of a 50/50 blend of 5-phenyltetrazole and microtalc CP 10-40. The polymer is extruded through a ribbon die 25 mm wide and 1.27 mm thick. The extruded polymer has an inherent viscosity of 0.55 and contains a foam structure of fine, spherical uniformly dispersed bubbles.

Several lengths of ribbon approximately 150 mm long, 17 mm thick and between 1.3 and 1.9 mm thick are placed in an air circulating oven at room temperature and the oven is heated to 235° C. in 77 minutes. At 46 minutes, the oven temperature is 233° C. and opacity is observed in the ribbons. At 65 minutes and an oven temperature of 235° C. the ribbons appear completely opaque. The ribbons after 77 minutes have a melting point of 295° C. and a heat of fusion of 30 J/g.

Sections of the polymer ribbon before and after thermal crystallization are shaped into tensile bars and the tensile modulus is measured by AST Method D-638. The modulus before crystallization is 1793 MPa and after crystallization is 2317 MPa.

What is claimed is:

1. A process for crystallizing a crystallizable linear polyester which comprises dispersing a chemical blowing agent in the molten polyester, extruding the molten polyester to form a solid closed cell foam and maintaining the solid foam at a temperature above the glass transition temperature of the polyester until crystallization occurs and the crystallized polyester has a heat of fusion in the range of about 12 to about 40 J/g.

2. The process of claim 1 wherein the crystallized polyester has a heat of fusion of about 16 to about 30 J/g.

3. The process of claim 1 or 2 wherein the chemical blowing agent has a decomposition temperature above the glass transition temperature of the polymer.

4. The process of claim 1 or 2 wherein the chemical blowing agent and its products of decomposition are inert to the polymer.

5. The process of claim 1 or 2 wherein the quantity of blowing agent dispersed in the molten polyester is in the range of about 0.02 to about 1.5 parts per 100 parts by weight of polymer.

6. The process of claim 1 or 2 wherein the quantity of blowing agent dispersed in the molten polyester is in the range of about 0.1 to about 0.5 part per 100 parts by weight of polymer.

7. The process of claim 1 or 2 wherein the blowing agent is selected from the group consisting of tetrazoles, hydrazides, hyrazines, semicarbazides, carbazates and dinitrosoamides.

8. The process of claim 1 or 2 wherein the crystallizable linear polyester is the polyester condensate of a diphenol and an aromatic dicarboxylic acid.

9. The process of claim 1 or 2 wherein the crystallizable linear polyester is a polyester of 2,2-bis(4-hydroxyphenyl)propane and a mixture of isophthalic and terephthalic acids containing from 100-75 mole percent isophthalic acid and from 0 to 25 percent terephthalic acid.

10. The process of claim 1 or 2 wherein the crystallizable linear polyester is a polyester of 2,2-bis(4-hydroxyphenyl)propane and isophthalic acid of inherent viscosity in the range of about 0.15 to about 0.7 dl/g.

11. A process for crystallizing a crystallizable linear polyester which comprises dispersing a chemical blowing agent in the molten polyester, extruding the molten polyester to form a solid closed cell foam, and maintaining the solid foam at a temperature above the glass transition temperature of the polyester until crystallization occurs and the crystallized polyester has a heat of fusion in the range of about 16 to about 30 J/g., wherein the polyester is a condensate of a diphenol and an aromatic dicarboxylic acid, wherein the quantity of blowing agent dispersed in the molten polyester is in the range of about 0.2 to about 0.5 part per 100 parts by weight of polyester, wherein the chemical blowing agent has a decomposition temperature above the glass transition temperature of the polyester and wherein the chemical blowing agent and its products of decomposition are inert to the polyester.

12. The process of claim 11 wherein the chemical blowing agent is selected from the group consisting of tetrazoles, hydrazides, hydrazines, semicarbazides and carbazates.

13. The process of claim 11 wherein the chemical blowing agent is selected from the group consisting of 5-phenyltetrazole, 5-tolyltetrazole and 5-cyclohexyltetrazole.

14. The process of claim 11, 12 or 13 wherein the polyester is a condensate of 2,2-bis(4-hydroxyphenyl)propane.

15. The process of claim 11, 12 or 13 wherein the polyester is a condensation product of 2,2-bis(4-hydroxyphenyl)propane and isophthalic acid of inherent viscosity in the range of about 0.15 to about 0.7 dl/g.

16. A process for solid state polymerization of a crystallizable linear polyester which comprises melting the polyester, dispersing a chemical blowing agent in the molten polyester, extruding the molten polyester to form a solid closed cell foam, maintaining the solid foam at a temperature above the glass transition temperature of the polyester to crystallize the polyester and develop a heat of fusion in the range of about 12 to about 40 J/g and increasing the degree of polymerization of the polyester by heating the crystallized solid foam at a temperature below its sticking temperature.

17. The process of claim 16 wherein the crystallized polyester has a heat of fusion in the range of about 16 to about 30 J/g.

18. The process of claim 16 or 17 wherein the chemical blowing agent has a decomposition temperature above the glass transition temperature of the polyester.

19. The process of claim 16 or 17 wherein the chemical blowing agent and its products of decomposition are inert to the polyester.

20. The process of claim 16 or 17 wherein the quantity of blowing agent dispersed in the molten polyester is in the range of about 0.02 to about 1.5 parts per 100 parts by weight of polyester.

21. The process of claim 16 or 17 wherein the quantity of blowing agent dispersed in the molten polyester is in the range of about 0.1 to about 0.5 part per 100 parts by weight of polyester.

22. The process of claim 16 or 17 wherein the crystallizable linear polyester is the polyester condensate of a diphenol and an aromatic dicarboxylic acid.

23. The process of claim 16 or 17 wherein the blowing agent is selected from the group consisting of tetrazoles, hydrazides, hydrazines, semicarbazides, carbazates and dinitrosoamides.

24. The process of claim 16 or 17 wherein the crystallizable linear polyester is a polyester of 2,2-bis(4-hydroxyphenyl)propane.

25. The process of claim 16 or 17 wherein the crystallizable linear polyester is a polyester of 2,2-bis(4-hydroxyphenyl)propane and isophthalic acid of inherent viscosity in the range of about 0.15 to about 0.7 dl/g$^{-1}$.

26. The process of claim 25 wherein the blowing agent is selected from the group consisting of 5-phenyltetrazole, 5-tolyltetrazole and 5-cyclohexyltetrazole.

27. The process of claim 16 wherein the polyester foam is extruded in sheets or strands.

28. The process of claim 26 wherein the extruded polyester is chopped into small particles.

29. A process for solid state polymerization of a crystallizable linear polyester which comprises dispersing a chemical blowing agent in the molten polyester, extruding the molten polyester to form a solid foam, maintaining the solid foam at a temperature above the glass transition termperature of the polyester to crystallize the polyester and develop a heat of fusion in the range of about 16 to about 30 J/g, and increasing the degree of polymerization of the polyester by heating the crystallized solid foam at a temperature below its sticking temperture, wherein the polyester is a condensate of a diphenol and an aromatic dicarboxylic acid, wherein the quantity of blowing agent dispersed in the molten polyester is in the range of about 0.2 to about 0.5 part per 100 parts by weight of polyester, wherein the chemical blowing agent has a decomposition temperature above the glass transition temperature of the polyester and wherein the chemical blowing agent and its products of decomposition are inert to the polyester.

30. The process of claim 29 wherein the chemical blowing agent is selected from the group consisting of tetrazoles, hydrazides, hydrazines, semicarbazides, carbazates and dinitrosoamides.

31. The process of claim 29 or 30 wherein the polyester is a condensation product of 2,2-bis(4-hydroxyphenyl)propane and iosphthalic acid of inherent viscosity in the range of about 0.15 to about 0.7 dl/g$^{-1}$.

32. The process of claim 29 or 30 wherein the polyester foam is extruded in sheets or strands.

33. The process of claim 32 wherein the extruded polyester is chopped into small particles.

34. The process of claim 29 or 30 wherein the polymerization step is carried out while the crystallized solid foam is subjected to reduced pressure.

35. The process of claim 29 or 30 wherein the polymerization step is carried out while a stream of inert gas flows over the crystallized solid foam.

* * * * *